(12) United States Patent
Gunduzhan et al.

(10) Patent No.: US 7,941,531 B2
(45) Date of Patent: May 10, 2011

(54) AGE BIASED DISTRIBUTED COLLISION RESOLUTION WITHOUT CLOCKS

(75) Inventors: Emre Gunduzhan, Bethesda, MD (US); Peter Ashwood-Smith, Gatineau, CA (US)

(73) Assignee: Nortel Networks Limited, Mississauga, Ontario (CA)

(*) Notice: Subject to any disclaimer, the term of this patent is extended or adjusted under 35 U.S.C. 154(b) by 346 days.

(21) Appl. No.: 12/276,623

(22) Filed: Nov. 24, 2008

(65) Prior Publication Data
US 2010/0131635 A1 May 27, 2010

(51) Int. Cl.
*G06F 15/173* (2006.01)
(52) U.S. Cl. .......................... 709/224; 709/240; 709/243
(58) Field of Classification Search .................. None
See application file for complete search history.

(56) References Cited

U.S. PATENT DOCUMENTS

| | | | |
|---|---|---|---|
| 7,639,663 B1 * | 12/2009 | Nerses et al. | 370/347 |
| 7,685,297 B2 * | 3/2010 | Hietala et al. | 709/229 |
| 2006/0039370 A1 * | 2/2006 | Rosen et al. | 370/389 |
| 2009/0106801 A1 * | 4/2009 | Horii | 725/91 |
| 2009/0222875 A1 * | 9/2009 | Cheng et al. | 725/147 |

* cited by examiner

*Primary Examiner* — John B. Walsh
(74) *Attorney, Agent, or Firm* — Christopher & Weisberg, P.A.

(57) ABSTRACT

A method resolves collisions in a networking system that includes a plurality of entities operable to transmit an intention to reserve a resource. A first request to reserve resources, which includes a listing of the resources along the first transmission path and a first intention priority value, is broadcast through the networking system. The first intention priority value is determined as a function of other intention priority values previously broadcast through the networking system. A second request is received. The second request includes a second intention priority value and at least one of the same resources included in the first request, thereby indicating a collision. The collision is resolved by comparing the first intention priority value to the second intention priority value. If the collision is resolved in favor of the first request, data is routed through the networking system using the resources along the first transmission path.

20 Claims, 4 Drawing Sheets

AGE BIASED DISTRIBUTED COLLISION RESOLUTION WITHOUT CLOCKS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for distributed collision resolution in a communication system and more specifically to a method and system for resolving collisions in a communication system based on age, without the use of clocks or signaling.

BACKGROUND OF THE INVENTION

Computer networking and communications may involve the transfer of millions of data packets simultaneously. In many environments, some network resources need to be reserved before starting to send data packets, to make data transfer more reliable. In such cases hundreds, thousands or more distributed entities compete to reserve the same resources by exchanging control packets for reservation. Generally, the entity that requests a particular resource is granted the use of that resource. However, because of the sheer volume of network traffic and the number of entities in a network, two or more entities may request the same resource at the same instant. The simultaneous conflicting requests for a resource is commonly known as a "collision," and the process of determining which request will be accepted is known as a "collision resolution."

In some environments collision resolution is performed locally by the network entity that has the requested resource. This resolution requires an exchange of control packets between the entities requesting the resource and the entity that has the requested resource. In other environments, collision resolution is performed directly by the entities requesting the resource, without involving the entity that has the requested resource. This form of collision resolution is known as a "distributed collision resolution," since multiple entities participate in the collision resolution.

For example, a mesh network generally consists of a large number of nodes each connected to a small subset of the nodes on the network, i.e., not every node is directly connected to each other node. If a node wants to reserve a resource on the network, the node may simply "flood" the network by broadcasting its request to its immediate neighbors. In turn, each neighbor asks its own neighbors to forward the request to their neighbors. This process is repeated until all the nodes have been contacted. At the end of this flooding process, every node in the network learns that the initial node requests to reserve the resource, and the request is automatically accepted if no conflicting requests exist in the network. However, there are instances where more than one node may request to reserve the same resource at the same time, causing a collision. In these instances, the nodes need to make intelligent decisions concerning which request will be accepted.

The age of the request may be an important deciding factor in determining which request is accepted, i.e., the "winner," and which request is not, i.e., the "loser," in a distributed collision resolution. For example, if age is not used as a deciding factor, then a newer request for a resource can be a winner and an older request that was previously accepted can be a loser. But the resource may already be in use by the node that generated the older request, and this may cause the allocation of the resource to be transferred from one requester to the other prematurely. Such a case has to be avoided in many environments to avoid terminating file transfers in the middle, to avoid dropping voice conversations in the middle, and so on. Current methods of determining the winner and/or loser in a collision resolution where age is a deciding factor depend upon signaling or the use of synchronized clocks.

Signaling is a normal mechanism used to deal with resource requests; however, signaling requires a complex protocol to implement which consumes network resources and may cause processing delays. Another solution is to use actual clock time to set priorities, but this solution requires network-wide coordination of all the clocks. Not only is this solution expensive to implement, it may not be physically possible. Therefore, what is needed is a system and method for distributed collision resolution in a communication system where age is a deciding factor without using signaling or synchronized clocking.

SUMMARY OF THE INVENTION

The present invention advantageously provides a method and system for distributed collision resolution for resource reservations in a networking system. Generally, each node requesting a resource appends a priority value to its request, wherein the value of the priority is greater than the maximum priority value seen at the present time. Thus, the priority value acts as a proxy for age. Collisions are resolved in favor of the "oldest" competing request.

In accordance with one aspect of the present invention, a method is provided for distributed collision resolution for resource reservations in a networking system. The networking system includes a plurality of entities operable to transmit an intention to reserve a resource. A first request to reserve resources, which includes a listing of the resources along a first transmission path and a first intention priority value determined as a function of other intention priority values previously broadcast through the networking system is created. The request to reserve resources is broadcast through the networking system. A second request to reserve resources is received. The second request includes a second intention priority value and at least one of the same resources included in the first request, thereby indicating a collision. The collision is resolved based on a comparison of the first intention priority value to the second intention priority value. If the collision is resolved in favor of the first request, data is routed through the networking system using the resources along the first transmission path.

In accordance with another aspect of the present invention, a distributed networking system for resolving collisions includes a plurality of nodes. Each node is operable to broadcast a first request to reserve resources through the networking system. The request includes a listing of resources along a first transmission path and a first intention priority value determined as a function of other intention priority values previously broadcast through the networking system. Each node is further operable to receive a second request to reserve resources, the second request having been broadcast by another node. The second request includes a second intention priority value and at least one of the same resources included in the first request, thereby indicating a collision. Each node resolves the collision based on a comparison of the first intention priority value to the second intention priority value, and if the collision is resolved in favor of the first request, routes data through the distributed networking system using the resources along the first transmission path.

In accordance with yet another aspect of the present invention, an apparatus is provided for resolving collisions in a distributed networking system. The distributed networking system includes a plurality of entities operable to transmit an intention to reserve a resource. The apparatus includes a controller and a communication interface. The communication interface is communicatively coupled to the controller. The controller operates to create a first request to reserve resources which includes a listing of the resources along the first transmission path and a first intention priority value determined as a function of other intention priority values previously broadcast through the networking system. The controller further operates to resolve collisions based on a comparison of the first intention priority value to a received intention priority value. The communication interface operates to broadcast the first request to reserve resources through the networking system and receive a second request to reserve resources. The second request includes a second intention priority value and at least one of the same resources included in the first request, thereby indicating a collision.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
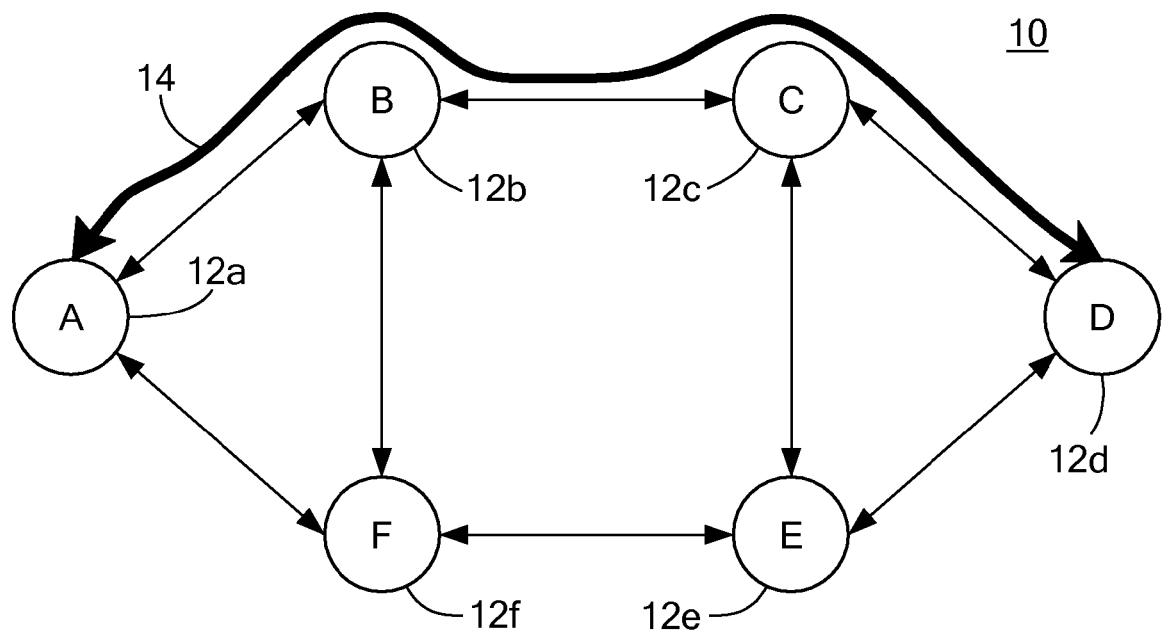
FIG. 1 is a block diagram of an exemplary collision resolution system constructed in accordance with the principles of the present invention.

Before describing in detail exemplary embodiments that are in accordance with the present invention, it is noted that the embodiments reside primarily in combinations of apparatus components and processing steps related to implementing a system and method for resolving collisions in a communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Additionally, as used herein and in the appended claims, the term Provider Backbone Transport ("PBT") relates to a suite of communication protocols currently pending before the Institute of Electrical and Electronics Engineers ("IEEE") under the name Provider Backbone Bridge Traffic Engineering ("PBB-TE") as draft standard, IEEE 802.1Qay. "Zigbee" relates to a suite of high-level wireless communication protocols as defined by the IEEE standard 802.15.4. Further, "Wi-Fi" refers to the communications standard defined by IEEE 802.11. The term "WiMAX" means the communication protocols defined under IEEE 802.16. "BLUETOOTH" refers to the industrial specification for wireless personal area network ("PAN") communication developed by the Bluetooth Special Interest Group.

One embodiment of the present invention advantageously provides a method and system for a clock-free, signaling-free mechanism for a distributed set of entities to decide on win/loss of resource requests when there is contention for those resources. The entities factor in the age of a request so as to give higher or lower bias as a function of age.

An embodiment of the present invention can be used to setup connections with bandwidth requests using only a "flood" request since all entities can determine precisely and fairly who wins and who loses when there is contention.

In accordance with one embodiment of the present invention, when advertising an intention to take a resource, a distributed entity appends a priority field to that intention. The priority field is populated with a monotonically increasing function of all the other priority fields of all other requests seen to that point, e.g., priority=max priority+1. On resource contention, the priority is used by all entities to decide the winner and/or loser, which is naturally biased by "age." For example older requests may win over newer.

One embodiment of the present invention provides a process for resolving collisions without clocks that allows consistent distributed age biased win/loss decisions. A clock is not required and/or signaling is not required to properly coordinate a distributed collision loss/win with age bias among a distributed set of resource allocating entities that do not signal but can only broadcast their intentions. The invention may be implemented on any routing system having distributed resources that use a broadcast mechanism to take and release resources shared by entities that can talk over that broadcast mechanism, e.g., such as nodes in a link state network and where broadcast is a link state update, where each entity hears all the other broadcast requests to take and/or release resources.

Referring now to the drawing figures in which like reference designators refer to like elements, there is shown in FIG. 1 an exemplary communication network 10 that employs distributed collision resolution without using signaling or synchronized clocking. Network 10 includes an array of nodes 12a, 12b, 12c, 12d, 12e and 12f (referred to collectively as nodes 12). The nodes 12 may include wireless access points, hubs, routers, switches, gateways, or any other device commonly known to forward data packets in a communication network. Each node 12 may be hard-wired to neighboring nodes 12 and/or client devices and routes data packets between client devices using any combination of commonly used wired and/or wireless communication protocols such as Transmission Control Protocol/Internet Protocol ("TCP/IP"), Ethernet, PBT, etc. Additionally, each node 12 may communicate with neighboring nodes 12 and/or client devices using radio frequency ("RF") signals encoded according to standard communication protocols, such as Wi-Fi, Wi-MAX, Zigbee, BLUETOOTH, etc.

Of note, although several of the figures show six nodes 12, it is understood that six nodes 12 are shown solely to aid explanation. A network 10 constructed in accordance with the principles of the present invention may have fewer or more than six nodes 12. At the instant in time depicted in FIG. 1, a transmission path 14 is already established between node A 12a and node D 12d. Transmission path 14 routes information from node D 12d, through nodes C 12c and B 12b, in order to arrive at node A 12a. Likewise, information originating at node A 12a is routed through node B 12b and then node C 12c before arriving at node D 12d.

Figure 2:
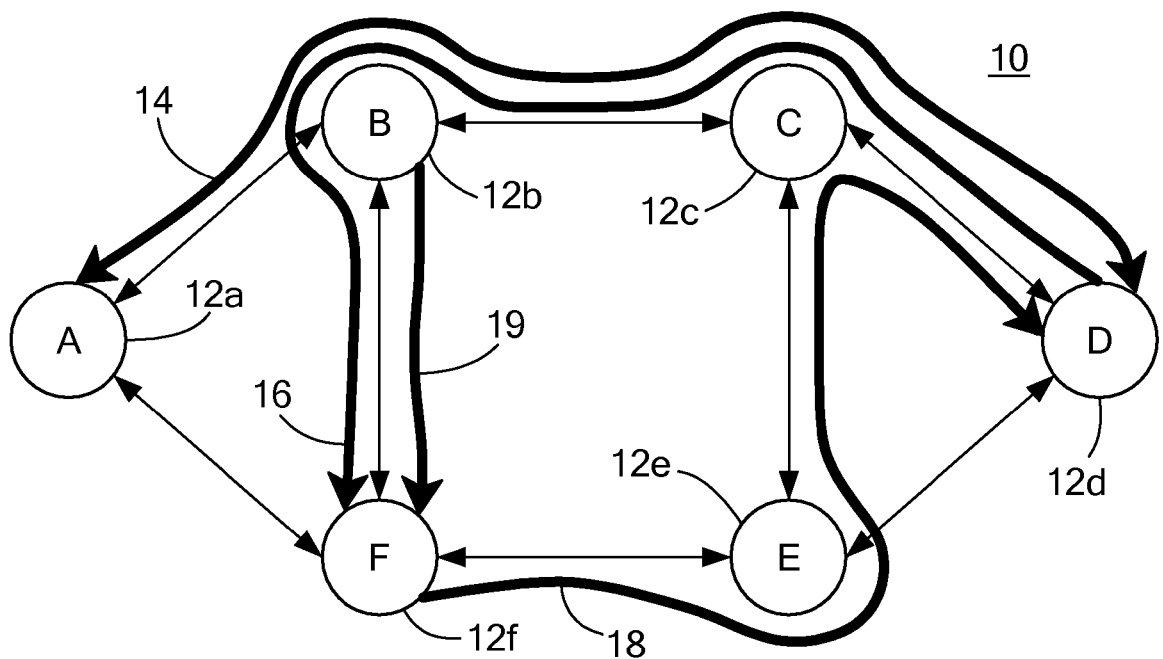
FIG. 2 is a block diagram illustrating a network collision in accordance with the principles of the present invention.

FIG. 2 illustrates the network 10 as indicated in FIG. 1 at a later instance of time. In FIG. 2, node B 12b has data to deliver to node F 12f, node D 12d also has data to deliver to node F 12f and node F 12f has data to deliver to node D 12d. Node B 12b requests to establish transmission path 19, which extends from node B 12b to node F 12f. Node D 12d requests to establish transmission path 16, which extends from node D 12d, through node C 12c and node B 12b before reaching node F 12f. Node F 12f also wishes to establish a transmission path 18 which runs from node F 12f, through node E 12e and node C 12c, and then to node D 12d. However, the link between node C 12c and node D 12d is currently overcommitted and cannot support all the information needing to be transferred along all three transmission paths 14, 16 and 18. Thus, a collision occurs at the link between node C 12c and node D 12d which is resolved in accordance with the principles of the present invention. An example of such resolution is described in detail below.

Figure 3:
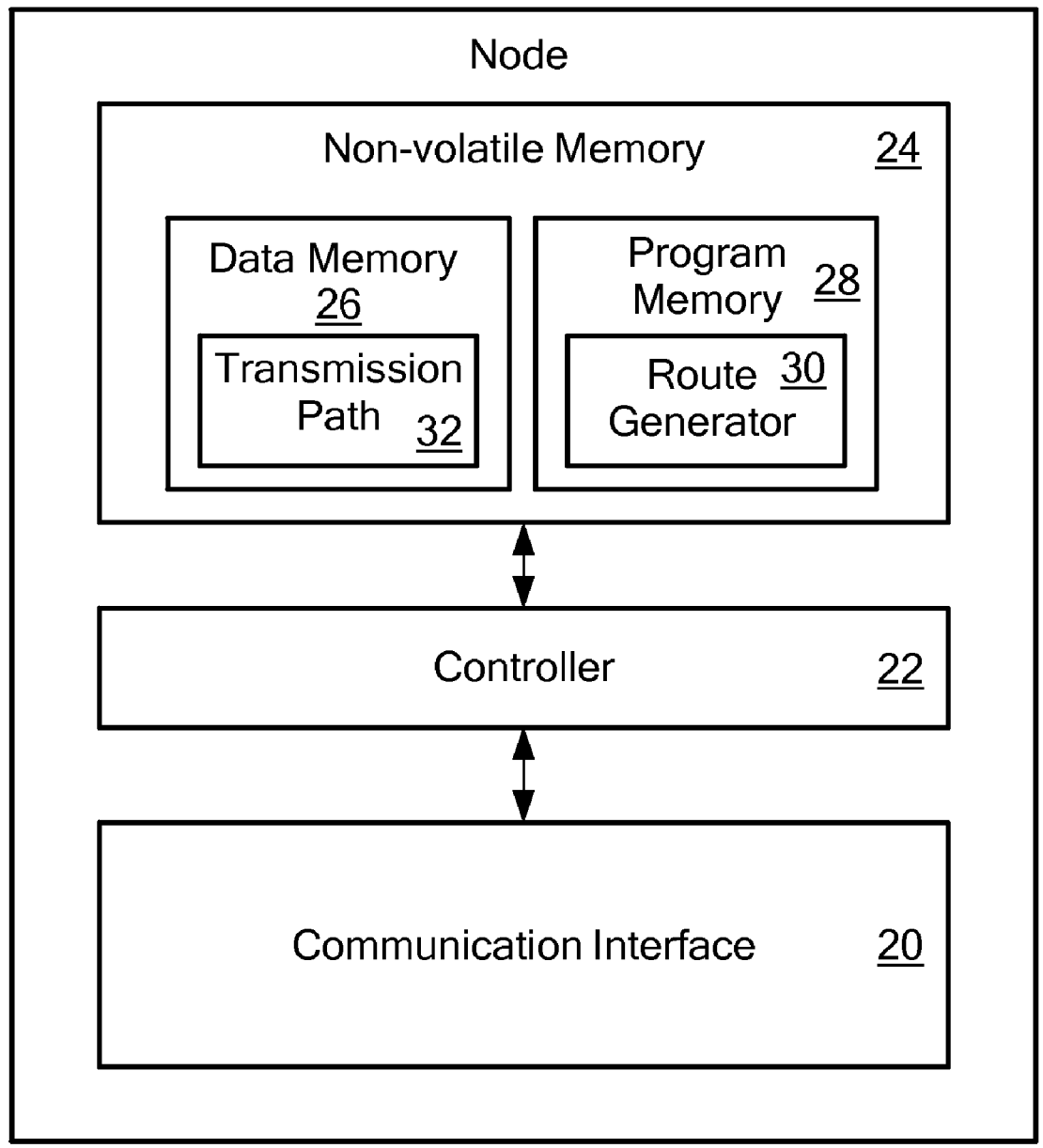
FIG. 3 is a block diagram of an exemplary node utilizing distributed collision resolution constructed in accordance with the principles of the present invention.

Referring now to FIG. 3, an exemplary node 12 includes a communication interface 20 communicatively coupled to a controller 22. The communication interface 20 may be wired, wireless, or any combination thereof. The communication interface 20 transfers data packets between the node 12 and other nodes 12 and resources of the communication network 10 using known communication protocols, e.g., PBT, Ethernet, Wi-Fi, etc. The communication interface may include any number of communication ports.

The controller 22 controls the processing of information and the operation of the node 12 in a well-known manner. The controller 22 is also coupled to a non-volatile memory 24. The non-volatile memory 24 includes a data memory 26 and a program memory 28. The program memory 28 contains a route generator 30 which determines the routing topology of the communication network 10, the operation of which is discussed in more detail below. The data memory 26 stores data files such a transmission path 32 which is created by the route generator 30 and contains a path for routing data through the network 10 and various other user data files (not shown).

In addition to the above noted structures, each node 12 may include additional, optional structures (not shown) which may be needed to conduct other functions of the node 12.

Figure 4:
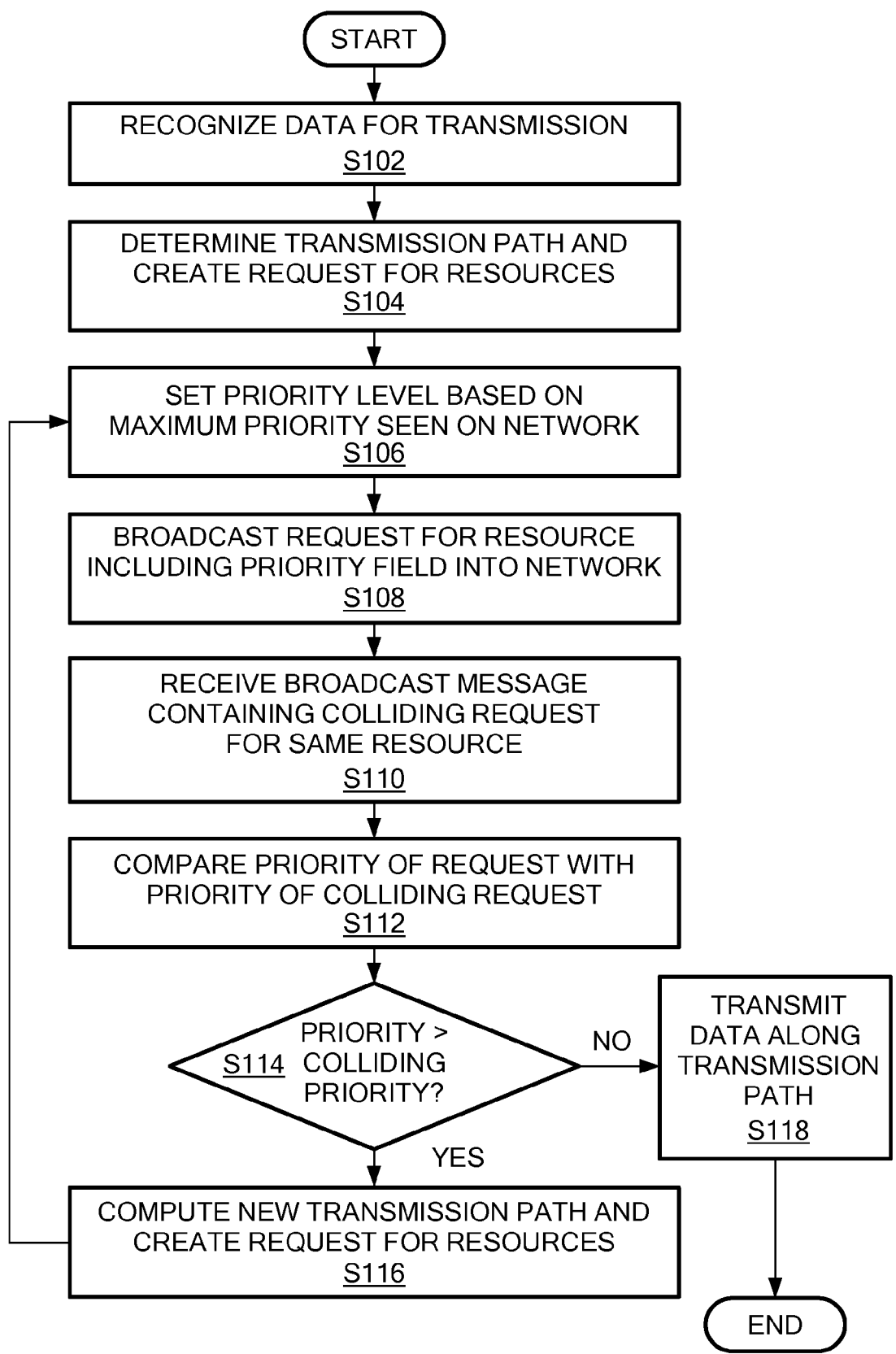
FIG. 4 is a flowchart of an exemplary distributed collision resolution process according to the principles of the present invention.

Referring now to FIG. 4, an exemplary operational flowchart is provided that describes steps performed by the route generator 30 for resolving collisions occurring within the network 10. The process begins when the controller 22 recognizes that the node 12 has data for transmission (step S102). The route generator 30 determines a transmission path 32 through the network 10 based on its current knowledge of the network topology (step S104) and creates a request for the resources along the transmission path. The route generator 30 sets a priority field of the request based on the maximum priority value seen on the network as of the current time (step S106) and broadcasts the request, including the priority field, into the network (step S108). The priority field may be set, for example, to a value that is simply 1 greater than the largest, i.e., maximum priority field seen so far, thereby creating a proxy for age. Because other nodes also send advertisements announcing their intention to take resources, the priority value "Priority=Priority$_{max}$+1" can easily be set as a proxy to identify a younger age. Alternatively, the priority field may also be set to any value greater than the maximum priority field seen so far by using a different function that can be either deterministic or random.

Figure 5:
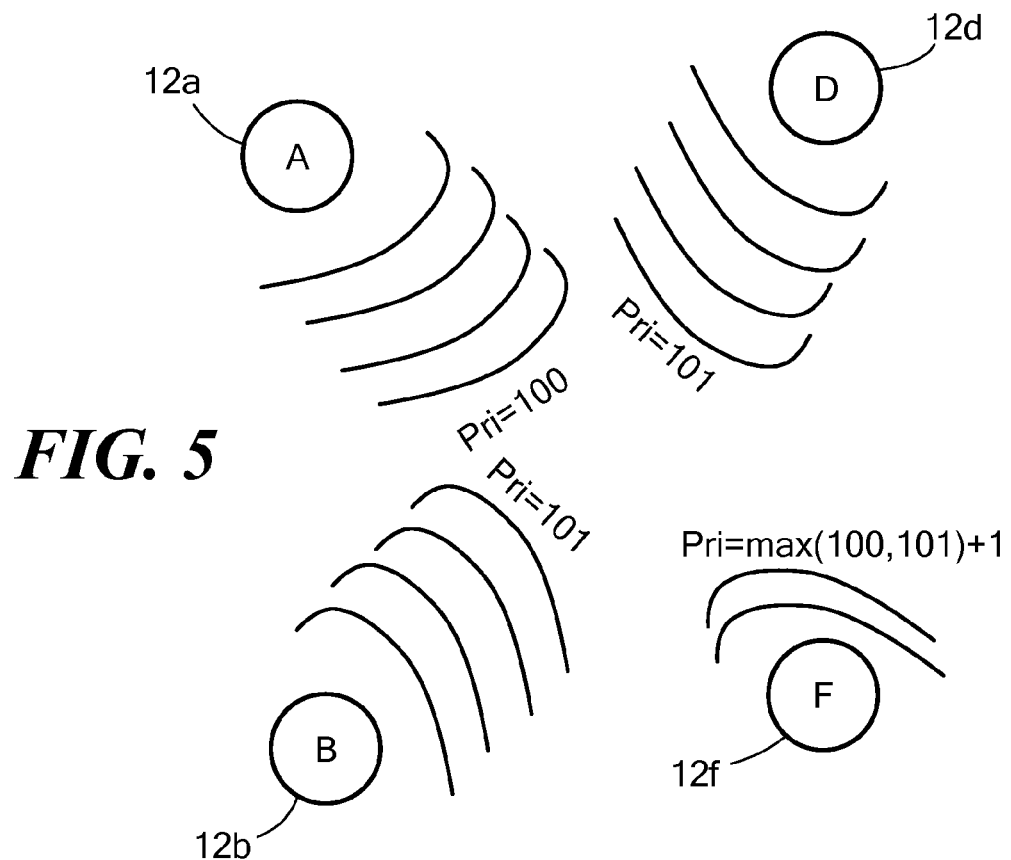
FIG. 5 is a block diagram of an exemplary priority level broadcast in accordance with the principles of the present invention.

For example, as shown in FIG. 5, node A 12a has previously broadcast a request to reserve resources having a priority value of 100. Subsequently, node B 12b and node D 12d broadcast their requests having a priority level of 101. Node F 12f receives the request from node B 12b before sending out its own request. Thus, when determining the priority value for its request, node F 12f takes the maximum of the priority values it has seen, i.e., max(100, 101), and adds 1 to this value, resulting in a priority value of 102 for this request.

Returning to the flowchart of FIG. 4, if the node receives a broadcast message that contains a request for the same resource that the node has attempted to reserve (step S110), the route generator 30 determines that a collision has occurred between its request and another announced request. The route generator 30 compares the priority of its own request with the priority of the colliding request (step S112) to determine if the node has won or lost the request. In this manner the age of the request is implicitly taken into consideration. Thus, the win/lose decision can be biased to favor older or younger requests without having to encode an absolute wall clock time in the priority field, thereby eliminating the need for clocks and/or signaling.

If the priority of the node's own request is greater than that of the colliding request (step S114), thereby indicating that the node request is younger than the colliding request, the route generator 30 computes a new transmission path 32, creates a new request for the resources along the new transmission path, and proceeds as in the initial request by setting the priority level of the new request (step S106) and so on. However, if the priority of the node's own request is less than that of the colliding request (step S114), the route generator realizes that the node's request is older than the colliding request and the communication interface 20 begins transmitting data along the originally chosen path (step S118). If both requests carry the same priority it means they originated at more or less the same time, and win/loss can be deterministically based on node identifier comparison or other well known mechanisms. Broadcasts into the network 10 reserve resources until the winning node releases them by another broadcast or they age-out in the absence of refreshing broadcasts.

Also, it should be noted that the value of the priority field may be periodically normalized to keep the dynamic range of the field from overflowing, i.e., "wrapping around", the actual field length.

It should also be noted that the value of the priority field may be compared using modulo arithmetic to avoid having to periodically normalize the field. Also, while smaller priority fields may imply older requests, it of course possibly to mathematically reverse this relationship, i.e., larger priority fields imply older requests, while at the same time reversing the resulting comparisons operators in the logic as presented.

It should also be noted that, in general, there may be more than two colliding requests for the same resource. In this case the route generator 30 compares the priority of its own request with the priority of all of the colliding requests (step S112). If the priority of the node's own request is less than that of all the colliding requests (step S114), the route generator 30 realizes that the node's request is older than all the colliding requests and therefore the node wins the requested resources. However, if the priority of the node's own request is greater than that of at least one colliding request (step S114), the route generator 30 realizes that the node's request is younger than at least one colliding request and therefore the route generator 30 computes a new transmission path 32. If the priority of the node's own request is equal to that of some colliding requests and at the same time not greater than that of any colliding requests, two or more requests originated at more or less the same time and win/loss can be deterministically based on node identifier comparison or other well known mechanisms.

Older resource requests take priority; therefore a new request does not interrupt an established connection. For example, returning to FIG. 2, requests to use resources along transmission paths 16 and 18 will not "kick out" transmission path 14, because transmission path 14 was established prior to receiving the requests to establish transmission paths 16 and 18.

Figure 6:
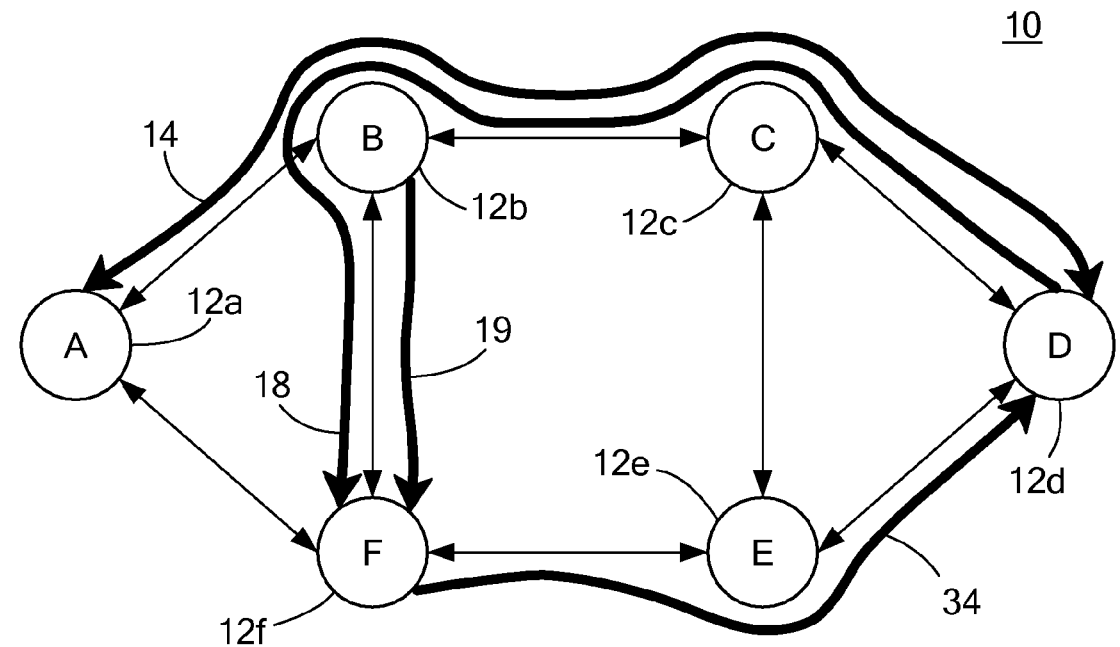
FIG. 6 is a block diagram illustrating resolution of a network collision in accordance with the principles of the present invention.

Continuing with the example shown in FIG. 2, FIG. 6 illustrates the resolution of this network collision. When node F 12f receives the request broadcast from node D 12d which also includes the overcommitted link between node C 12c and node D 12d, node F 12f realizes that the request from node D 12d is older, i.e., has a lower priority value, than its own request, recalculates its routing to transmission path 34, creates a new request for the resources along the new transmission path 34, and broadcasts the new request. Newly determined transmission path 34 does not include the overcommitted link between node C 12c and node D 12d. Similarly, when node D 12d receives the first request broadcast from node F 12f, it realizes that its own request is older, i.e., has a lower priority value, than the request from node F 12f so node D 12d does not calculate a new transmission path.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for distributed collision resolution for resource reservation in a networking system, the networking system including a plurality of entities operable to transmit an intention to reserve a resource, the method comprising:
   creating a first request to reserve resources, the first request including a listing of the resources along a first transmission path and a first intention priority value determined as a function of other intention priority values previously broadcast through the networking system;
   broadcasting the request to reserve resources through the networking system;
   receiving a second request to reserve resources, the second request including a second intention priority value and at least one of the same resources included in the first request, thereby indicating a collision;
   resolving the collision based on a comparison of the first intention priority value to the second intention priority value; and
   responsive to resolving the collision in favor of the first request, routing data through the distributed networking system using the resources along the first transmission path.

2. The method of claim 1, wherein resolving the collision is decided in a distributed fashion by all entities in the networking system.

3. The method of claim 1, wherein resolving the collision is determined based on an age of the first request and an age of the second request.

4. The method of claim 3, wherein increasing intention priority value is a proxy for one of inverse age and advancing age.

5. The method of claim 1, further comprising:
   monitoring all broadcasts from other entities of the networking system to determine other intention priority values; and
   storing at least one of a largest intention priority value monitored and a smallest monitored intention priority value.

6. The method of claim 5, wherein each intention priority value is computed as one of strictly larger than the largest intention priority value stored and strictly smaller than the smallest intention priority value stored.

7. The method of claim 6, wherein each intention priority value is computed by performing one of increasing the largest intention priority value stored and decreasing the smallest intention priority value stored.

8. The method of claim 7, wherein the first intention priority value is less than the second intention priority value, resolving the collision comprises:
   determining that the first request is older than the second request; and
   transmitting the data through the networking system along the first transmission path.

9. The method of claim 7, wherein the second intention priority value is less than the first intention priority value, resolving the collision comprises:
   determining that the second request is older than the first request;
   calculating a second transmission path through the networking system, the second transmission path not including the colliding resources; and
   transmitting the data through the networking system along the second transmission path.

10. The method of claim 7, wherein the intention priority values are included in a priority field, the priority field being periodically normalized.

11. The method of claim 7, wherein the first intention priority value is compared to the second intention priority value using modulo arithmetic.

12. A networking system for resolving collisions, the networking system comprising:
a plurality of nodes, each node operable to:
broadcast a first request to reserve resources through the networking system, the request including:
a listing of resources along a first transmission path; and
a first intention priority value determined as a function of other intention priority values previously broadcast through the networking system;
receive a second request to reserve resources, the second request having been broadcast by another node, the second request including a second intention priority value and at least one of the same resources included in the first request, thereby indicating a collision; and
resolve the collision based on a comparison of the first intention priority value to the second intention priority value; and
responsive to resolving the collision in favor of the first request, route data through the distributed networking system using the resources along the first transmission path.

13. The system of claim 12, wherein resolving the collision is decided in a distributed manner by all nodes in the networking system.

14. The system of claim 12, wherein resolving the collision is determined based on an age of the first request and an age of the second request.

15. The system of claim 12, wherein each node is further operable to:
monitor broadcasts from other nodes of the networking system to determine other intention priority values; and
store at least one of a largest monitored intention priority value and a smallest monitored intention priority value.

16. The system of claim 15, wherein each intention priority value is computed by performing one of increasing the largest intention priority value stored and decreasing the smallest priority value stored.

17. The system of claim 16, wherein the first intention priority value is less than the second intention priority value, each node is operable to resolve the collision by:
determining that the first request is older than the second request; and
transmitting the data through the networking system along the first transmission path.

18. The system of claim 16, wherein the second intention priority value is less than the first intention priority value, each node is operable to resolve the collision by:
determining that the second request is older than the first request;
calculating a second transmission path through the networking system, the second transmission path not including the colliding resources; and
transmitting the data through the networking system along the second transmission path.

19. An apparatus for resolving collisions in a networking system, the networking system including a plurality of entities operable to transmit an intention to reserve a resource, the apparatus comprising:
a controller operating to:
create a first request to reserve resources, the first request including a listing of the resources along a first transmission path and a first intention priority value determined as a function of other intention priority values previously broadcast through the networking system; and
resolve collisions based on a comparison of the first intention priority value to a received intention priority value; and
a communication interface communicatively coupled to the controller, the communication interface operating to:
broadcast the first request to reserve resources through the networking system; and
receive a second request to reserve resources, the second request including a second intention priority value and at least one of the same resources included in the first request, thereby indicating a collision.

20. The apparatus of claim 19, wherein responsive to determining that the first request is older than the second request, the communication interface is further operable to transmit the data through the networking system along the first transmission path; and
wherein responsive to determining that the second request is older than the first request:
the controller is further operable to calculate a second transmission path through the networking system, the second transmission path not including the colliding resources; and
the communication interface is further operable to transmit the data through the networking system along the second transmission path.

* * * * *